United States Patent
Sakamoto et al.

(10) Patent No.: US 7,495,398 B2
(45) Date of Patent: Feb. 24, 2009

(54) DISCHARGE LAMP LIGHTING APPARATUS

(75) Inventors: Kyoji Sakamoto, Kitasaku-gun (JP);
Ryu Terada, Kitasaku-gun (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 168 days.

(21) Appl. No.: 11/524,444

(22) Filed: Sep. 21, 2006

(65) Prior Publication Data
US 2007/0085491 A1     Apr. 19, 2007

(30) Foreign Application Priority Data
Oct. 14, 2005    (JP) .............................. 2005-300977

(51) Int. Cl.
*G05F 1/00*    (2006.01)

(52) U.S. Cl. ................. 315/292; 315/291; 315/293; 315/307; 315/308; 315/309; 315/310; 315/311; 315/224; 315/225; 315/267; 315/246; 315/209 R

(58) Field of Classification Search ......... 315/291–293, 315/307–311, 224, 225, 267, 246, 209 R
See application file for complete search history.

(56) References Cited

U.S. PATENT DOCUMENTS
2007/0138975 A1    6/2007 Suganuma et al. .......... 315/291

FOREIGN PATENT DOCUMENTS
JP    2001160497 A    1/1999
JP    A 2001-160497    6/2001

*Primary Examiner*—Douglas W Owens
*Assistant Examiner*—Jae Kim
(74) *Attorney, Agent, or Firm*—Oliff & Berridge, PLC

(57) ABSTRACT

A discharge lamp lighting apparatus includes: an inverter circuit including a switch circuit and a high-voltage transformer; a step-up circuit connected at the input stage of the inverter circuit; a control circuit to output a switch circuit controlling signal and a step-up circuit controlling signal; an on-off switching circuit connected at a input voltage line; and a switch signal buffering circuit connected between the control circuit and the switch circuit and adapted to relay the switch circuit controlling signal. A drive voltage is applied to the control circuit without going through the on-off switching circuit, and a drive voltage is applied to the switch signal buffering circuit via the on-off switching circuit. With such a structure, an excess rush current is inhibited from flowing into the discharge lamp thereby preventing its electrode wear and therefore increasing the product life of a lamp and enhancing reliability while achieving cost reduction and downsizing.

6 Claims, 6 Drawing Sheets

FIG. 6A (Prior Art) Input voltage Vi
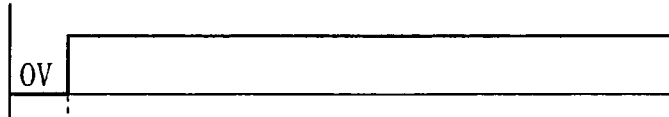
FIG. 6B (Prior Art) Boosted voltage Vj
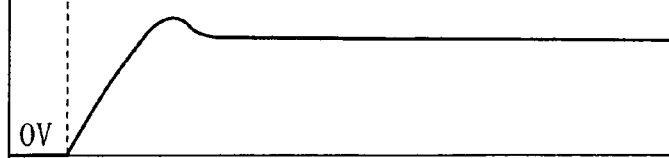
FIG. 6C (Prior Art) Input current A
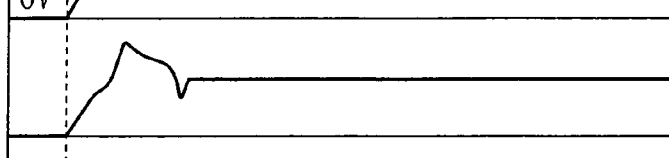
FIG. 6D (Prior Art) Step-up circuit gate signal B
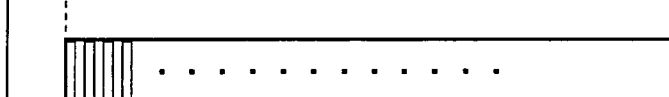
FIG. 6E (Prior Art) Output current C
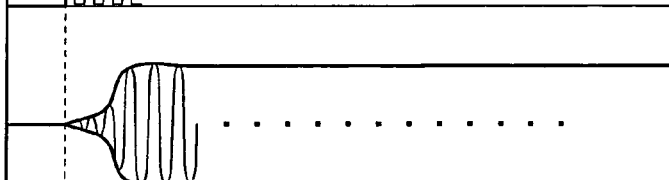
FIG. 6F (Prior Art) Switch circuit gate signal D
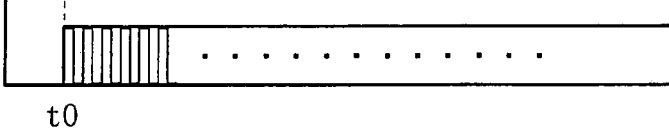
t0

DISCHARGE LAMP LIGHTING APPARATUS

BACKGROUND OF THE INVENTION

1. Field of the Invention

The present invention relates to a discharge lamp lighting apparatus, and particularly to a discharge lamp lighting apparatus used in various information equipments, such as a facsimile, a copier, a scanner, and the like, and adapted to provide illumination for reading documents.

2. Description of the Related Art

Recently, a light source for providing illumination for reading documents in various information equipments, such as a facsimile, a copier, a scanner, and the like, or a light source for a backlight device for use in a liquid crystal display (LCD) device is required to provide a high brightness, a long product life, and a high reliability. Consequently, a rare gas discharge lamp utilizing dielectric barrier discharge is increasingly used. The rare gas discharge lamp utilizing dielectric barrier discharge is found to have various advantages: for example, it has a high luminous efficiency, and it has no electrodes in the discharge space thus preventing decrease of its product life due to sputtering discharge. An apparatus to light such a rare gas discharge lamp conventionally incorporates a push-pull inverter circuit (refer, for example, to Japanese Patent Application Laid-Open No. 2001-160497).

FIG. 4 is a block diagram of a typical example of such a discharge lamp lighting apparatus as mentioned above. Referring to FIG. 4, a discharge lamp lighting apparatus 104 includes a control circuit 106, a step-up circuit 105, a switch circuit 107, a step-up transformer 118, and a smoothing capacitor 115, wherein an input voltage Vi from an external DC voltage supply is stepped by the step-up circuit 105 up to a voltage Vj (boosted voltage) which, while supplied to the smoothing capacitor 115, is adapted to drive the primary side of the step-up transformer 118 by means of the switch circuit 107 thereby lighting a discharge lamp 101 connected at the secondary side of the step-up transformer 118. During this operation, the control circuit 106, according to a feedback signal FB of the boosted voltage Vj, outputs a control signal GC for the step-up circuit 105 and a control signal GS for the switch circuit 107, thus both the step-up operation of the step-up circuit 105 and the switching operation of the switch circuit 107 are controlled only by one single circuit, namely the control circuit 106.

FIG. 5 is a circuit diagram showing a specific circuitry of the discharge lamp lighting apparatus 104 of FIG. 4. The step-up circuit 105 is a step-up chopper circuit which includes a choke coil 112 connected in series to the positive terminal of the DC voltage supply, a diode 114 connected in series to the choke coil 112, and a switching element 113 constituted by, for example, a power MOSFET and connected between ground and the connection point of the choke coil 112 and the diode 114, and which has its output terminal connected to the smoothing capacitor 115 to smooth the boosted voltage Vj. The step-up circuit 105 further includes a gate resistor 133 connected to the gate terminal of the switching element 113, and, in order to rapidly charge and discharge the gate capacitance to thereby achieve a high-speed switching operation, a differentiation circuit 136 composed of a capacitor 131 and a resistor 132 is connected to the gate resistor 133, and then a buffer circuit 135, which is structured such that the emitter and base terminals of an NPN transistor 129 are connected respectively to the emitter and base terminals of a PNP transistor 130, is connected to the differentiation circuit 136.

The switch circuit 107 includes two switching elements 116 and 117 which are each constituted by, for example, a power MOSFET, and which are connected respectively to the both terminals of the primary winding of the step-up transformer 118. The midpoint tap of the primary winding of the step-up transformer 118 is connected to the boosted voltage Vj, and the switching elements 116 and 117 and the step-up transformer 118 make up a push-pull inverter circuit. The switch circuit 107 further includes gate resistors 124 and 125 connected to the respective gate terminals of the switching elements 116 and 117, and the differentiation circuit 136 and the buffer circuit 135 are provided for each of the switching elements 116 and 117 in the same way as in the switching element 113 of the step-up circuit 105.

The control circuit 106 includes a PWM (pulse width modulation) control circuit 119, a switch circuit gate signal generating circuit composed of transistors 120 and 121 disposed at the output stage of the PWM control circuit 119 and resistors 122 and 123, and a step-up circuit gate signal generating circuit including a signal adder composed of diodes 126 and 127 and a resistor 128.

The PWM control circuit 119 includes an error amplifier 137 which receives a feedback signal FB generated such that the boosted voltage Vj is divided by a voltage dividing circuit 111 so as to be fed back, and a reference signal generated such that a reference voltage Vref is divided. A control pulse generated in the PWM control circuit 119 is pulse width modulated according to the comparison of the feedback signal FB with the reference signal thereby turning into switch circuit gate signals GL and GU to be inputted to the respective gate terminals of the switching elements 116 and 117 of the switch circuit 107, and into a step-up circuit gate signal GC to be inputted to the gate terminal of the switching element 113 of the step-up circuit 105.

The operation of the discharge lamp lighting apparatus 104 described above will be explained with reference to FIGS. 6A to 6F showing sequence charts. Referring first to FIG. 6A, when the input voltage Vi from the external DC voltage supply is applied to the step-up circuit 105 at time t0, the control circuit 106 starts its operation, whereby gate signals B and D are outputted respectively to the switching element 113 of the step-up circuit 105 and to the switching elements 116 and 117 of the switch circuit 107 as shown in FIGS. 6D and 6F, and the switching elements 113, 116 and 117 are caused to start their on-off operations. When the switching elements 113 of the step-up circuit 105 transits from an on-state to an off-state, an induction voltage is generated at the choke coil 112, whereby the boosted voltage Vj is generated across the both terminals of the smoothing capacitor 115 as shown in FIG. 6B.

When the input voltage Vi is applied to the step-up circuit 105, an input current A starts to flow with a large rush current generated instantaneously as shown in FIG. 6C. If the DC voltage supply does not have a sufficient supply capacity to cover current excess resulting from superposition of the rush current on the input current A, then the input voltage Vi of the DC voltage supply is lowered below the rated voltage. Generally, for preventing the lowering of the voltage of a DC power supply, the DC power supply is required to have an increased supply capacity, which results in an increased dimension of the DC power supply.

Further, since the gate signal B for the switching element 113 of the step-up circuit 105, and the gate signal D and the gate signal respectively for the switching elements 116 and 117 of the switch circuit 107 start their operations simultaneously, the rush current flowing into the smoothing capacitor 115 becomes large. Consequently, an output current C with a rush current superposed thereon flows in the discharge lamp 101 as shown in FIG. 6E, and therefore a stress on electrodes 103 and 103' of the discharge lamp 101 increases thus shortening the life of the discharge lamp 101. Also, generally, for reducing the rush current flowing into the discharge lamp 101 to any extent at all, delay operation must be performed in the step-up circuit 5, and consequently the current in the discharge lamp 101 inevitably has a current waveform with a delayed rise.

A conventional discharge lamp lighting apparatus generally includes an on-off switching circuit and a constant-voltage circuit both provided between a DC voltage supply and a control circuit, and is structured such that an input voltage from the DC voltage supply is preliminarily applied for putting a step-up circuit in a standby-state so that when the on-off switching circuit is turned on, the step-up circuit and the switch circuit are caused to start their operations so as to start lighting a discharge lamp. In such a discharge lamp lighting apparatus, since an input voltage Vi is preliminarily applied to a smoothing capacitor in a standby-state, the voltage at the smoothing capacitor rises from the input voltage Vi, not from 0 V, up to a prescribed boosted voltage Vj for lighting the discharge lamp. Consequently, the rush current is reduced when compared with the discharge lamp lighting apparatus 104 in which the voltage at the smoothing capacitor 115 rises from 0 V up to the boosted voltage Vj for lighting the discharge lamp 101.

However, it is still the case with the above-described conventional discharge lamp lighting apparatus that the step-up circuit and the switch circuit starts their operations simultaneously for lighting the discharge lamp, and the output current composed such that the rush current flowing into the smoothing capacitor is superposed on the input current is caused to flow in the discharge lamp thus raising the same problem as the discharge lamp lighting apparatus 104.

SUMMARY OF THE INVENTION

The present invention has been made in light of the problem described above, and it is an object of the present invention to provide a discharge lamp lighting apparatus in which a supply voltage from a DC voltage supply is inhibited from lowering due to a rush current superposed on an input current, and in which an excess rush current is inhibited from flowing into a discharge lamp thereby increasing the life of the discharge lamp and enhancing reliability.

In order to achieve the object of the present invention, according to an aspect of the present invention, there is provided a discharge lamp lighting apparatus which includes: an inverter circuit including a switch circuit and a high-voltage transformer, wherein the primary side of the high-voltage transformer is driven by the inverter circuit thereby lighting a discharge lamp connected at the secondary side of the high-voltage transformer; a step-up circuit connected at the input stage of the inverter circuit; a control circuit to output a switch circuit controlling signal for controlling the operation of the switch circuit and a step-up circuit controlling signal for controlling the operation of the step-up circuit; an on-off switching circuit connected at a input voltage line; and a switch signal buffering circuit connected between the control circuit and the switch circuit and adapted to relay the switch circuit controlling signal. In the discharge lamp lighting apparatus, a drive voltage is applied to the control circuit without going through the on-off switching circuit, and a drive voltage is applied to the switch signal buffering circuit via the on-off switching circuit.

With the structure described above, when an input voltage is applied to the discharge lamp lighting apparatus, the on-off switching circuit is turned off, and the switch signal buffering circuit is out of operation, whereby the switch circuit controlling signal is prevented from getting to the switch circuit. Consequently, the on-off switching circuit is in a standby-state immediately after an input voltage is supplied, and only the step-up circuit is in a position to operate. Thus, it is enabled that the on-off switching circuit is caused to transit to an on-state after a certain period so as to activate the switch signal buffering circuit, and the switch circuit is caused to start its operation, which suppresses a rush current to be superposed on an input current supplied to the discharge lamp lighting apparatus.

In the aspect of the present invention, the discharge lamp lighting apparatus may further include a start triggering circuit connected to the control circuit. The start triggering circuit operates such that the control circuit increases an output of the step-up circuit temporarily when the on-off switching circuit transits to an on-state. Consequently, the discharge lamp can be rapidly and stably lighted.

In the aspect of the present invention, the step-up circuit may be a step-up chopper circuit including a choke coil connected in series to the input voltage line, an diode connected in series to the choke coil, and a switching element connected between ground and a connection point of the choke coil and the diode, the switch circuit may include at least one switching element connected to the primary side of the high-voltage transformer, and the control circuit may include a pulse width modulation control circuit to generate, according to a reference voltage, pulse width modulating signals for controlling respective on-off operations of the switching element of the step-up circuit and the at least one switching element of the switch circuit.

In the aspect of the present invention, the start triggering circuit may be a reference voltage shifting circuit functioning to shift the reference voltage so as to temporarily increase the on-duty of the switching element of the step-up circuit.

In the aspect of the present invention, the discharge lamp may be a rare gas discharge lamp utilizing a dielectric barrier discharge, and the switch circuit may be a push-pull switching circuit.

In the aspect of the present invention, the output signal of the on-off switching circuit may be controlled by an on-off signal externally inputted.

In the aspect of the present invention, the discharge lamp lighting apparatus may further include a constant-voltage circuit connected between the input voltage line and the on-off switching circuit. The constant-voltage circuit supplies respective drive voltages to the control circuit, the switch buffering circuit, and the switch circuit.

In the discharge lamp lighting apparatus described above, the supply voltage from the DC voltage supply is inhibited from lowering due to a rush current superposed on an input current, and an excess rush current is inhibited from flowing into the discharge lamp thereby increasing the life of the discharge lamp and enhancing reliability.

BRIEF DESCRIPTION OF THE DRAWINGS

FIGS. 6A to 6F are sequence charts for explaining an operation of the discharge lamp of FIG. 4.

DETAILED DESCRIPTION OF THE INVENTION

An exemplary embodiment of the present invention will hereinafter be described with reference to the accompanying drawings.

Figure 1:
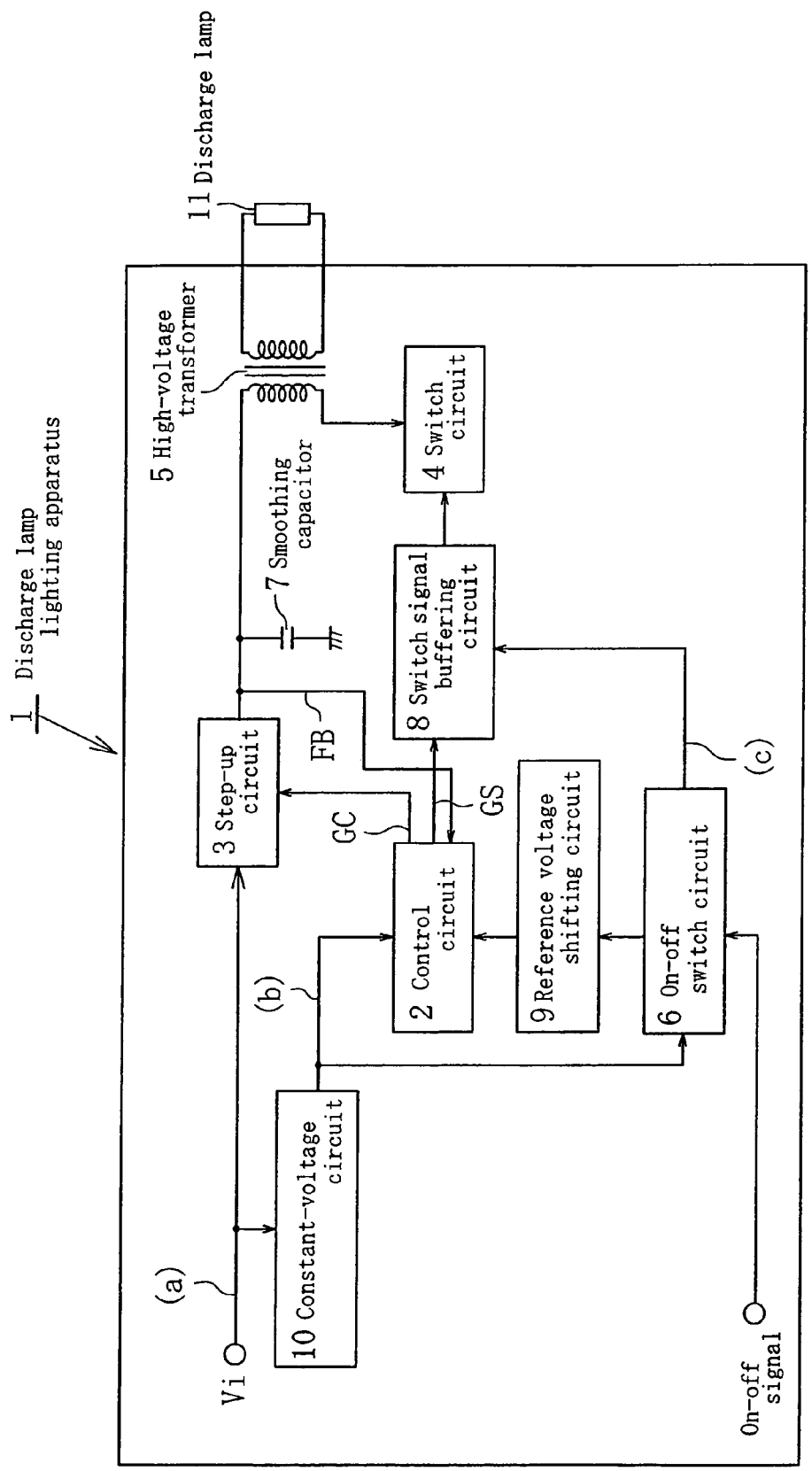
FIG. 1 is a block diagram of a discharge lamp lighting apparatus according to an embodiment of the present invention.

Referring to FIG. 1, a discharge lamp lighting apparatus 1 according to an embodiment of the present invention includes an inverter circuit composed of a switch circuit 4 and a high-voltage transformer 5, a step-up circuit 3 connected at the input stage of the inverter circuit, and a control circuit 2 to generate a switch circuit controlling signal GS for controlling the operation of the switch circuit 4 and a step-up circuit controlling signal GC for controlling the operation of the step-up circuit 3, wherein the inverter circuit drives the primary side of the high-voltage transformer 5 thereby lighting a discharge lamp 11 connected at the secondary side of the high-voltage transformer 5. A smoothing capacitor 7 is connected to the output terminal of the step-up circuit 3.

The discharge lamp lighting apparatus 1 further includes an on-off switching circuit 6 connected to an input voltage line (a) via a constant-voltage circuit 10, and a switch signal buffering circuit 8 connected between the control circuit 2 and the switch circuit 4 and adapted to relay the switch circuit controlling signal GS. A drive voltage (b) from the constant-voltage circuit 10 is applied directly to the control circuit 2 without going through the on-off switching circuit 6, while a drive voltage (c) from the constant-voltage circuit 10 is applied to the switch signal buffering circuit 8 via the on-off switching circuit 6. Further, a reference voltage shifting circuit 9 as a start triggering circuit is connected between the control circuit 2 and the on-off switching circuit 6. Thus, the discharge lamp lighting apparatus 1 receives an input voltage Vi from an external DC voltage supply, and receives also an on-off signal from an external on-off signal generating circuit (not shown) or the like, which switch the on- and off-states of the on-off switching circuit 6.

Figure 2:
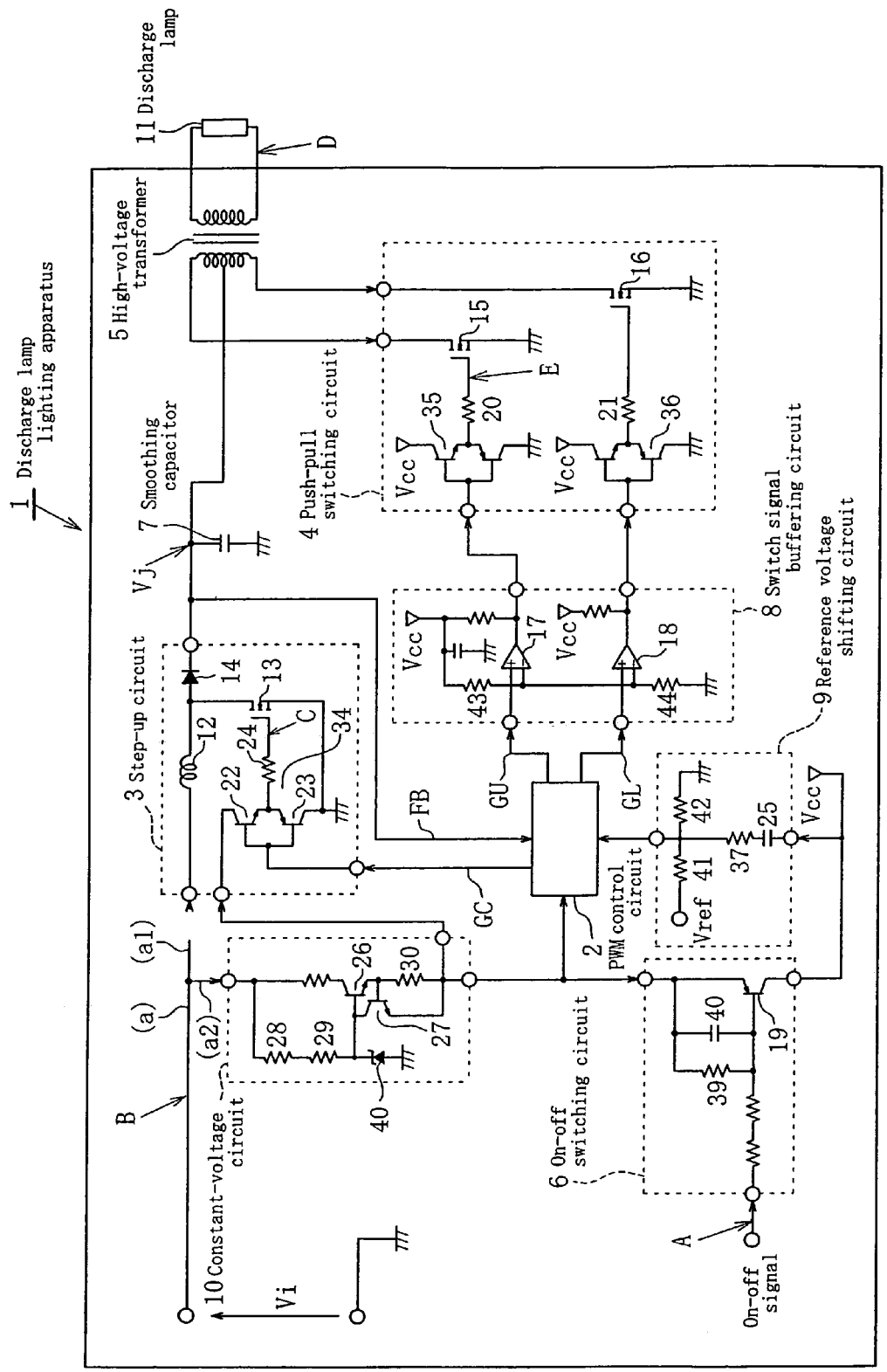
FIG. 2 is a circuit diagram of the discharge lamp lighting apparatus of FIG. 1.

Referring to FIG. 2, the step-up circuit 3 is a step-up chopper circuit, and includes a choke coil 12 connected in series to an input voltage line (al), a diode 14 connected in series to the choke coil 12, and a switching element 13 connected between ground and the connection point of the choke coil 12 and the diode 14. The switching element 13 is preferably constituted by a power MOSFET and has its gate terminal connected to a gate resistor 24 which, in order to rapidly charge and discharge the gate capacitance thereby achieving a high-speed switching performance, has at its input stage a buffer circuit 34 structured such that the emitter and base terminals of an NPN transistor 22 are connected respectively to the emitter and base terminals of a PNP transistor 23. And, as described earlier, the smoothing capacitor 7 is connected to the output terminal of the step-up circuit 3.

The switch circuit 4 is a push-pull switching circuit (hereinafter referred to as "push-pull switching circuit 4 as appropriate), and includes two switching elements 15 and 16 each preferably constituted by a power MOSFET. The switching elements 15 and 16 are connected respectively to the both terminals of the primary winding of the high-voltage transformer 5, and a boosted voltage Vj from the step-up circuit 3 is inputted to the midpoint tap of the primary winding of the high-voltage transformer 5. A push-pull inverter circuit is constituted by the switching elements 15 and 16, and the high-voltage transformer 5. Like the switching element 13 of the step-up circuit 3, the switching elements 15 and 16 have their gate terminals connected respectively to gate resistors 20 and 21 which have respective buffer circuits 35 and 36 connected at their input stages.

Figure 5:
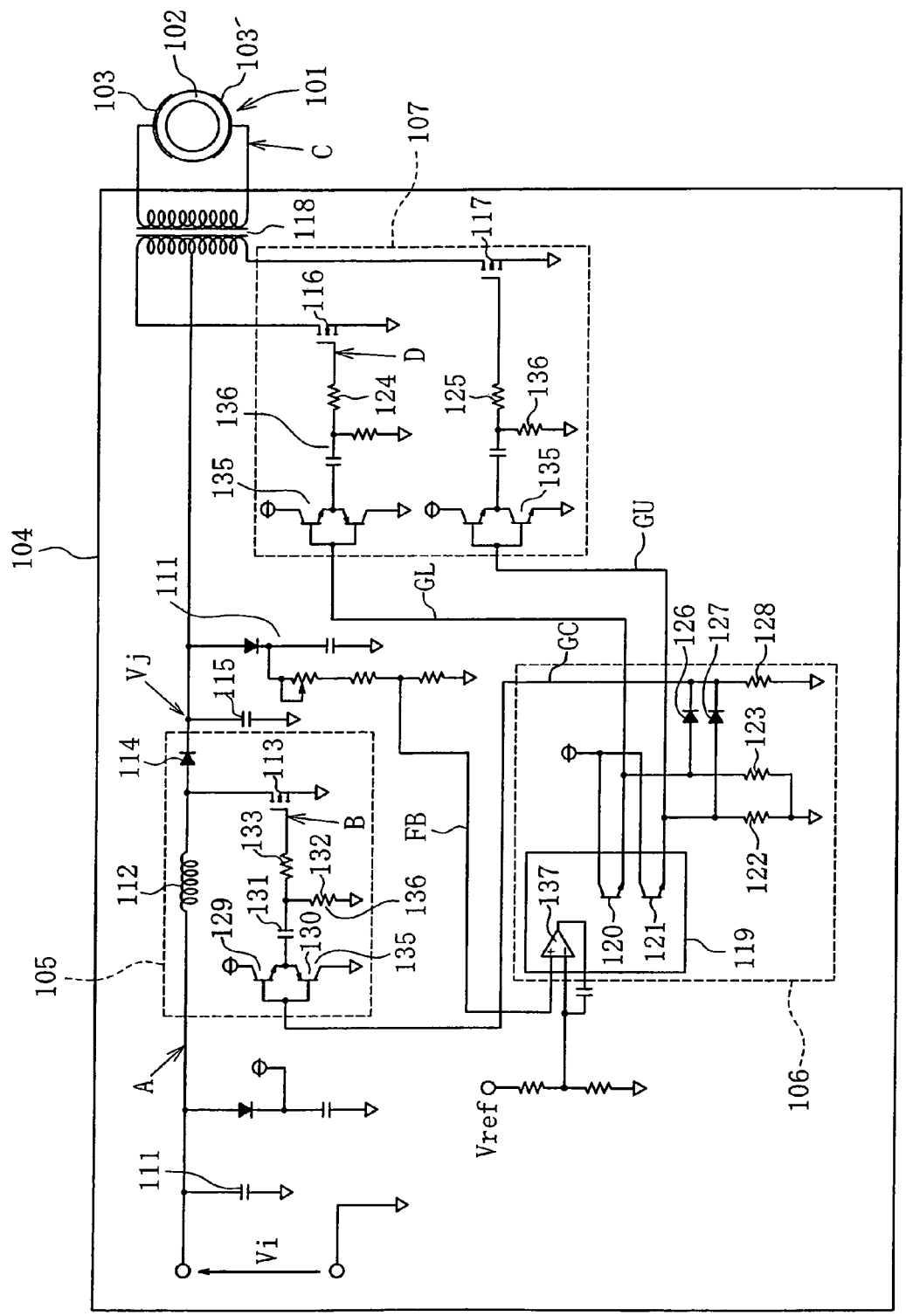
FIG. 5 is a circuit diagram of the discharge lamp lighting apparatus of FIG. 4.

The control circuit 2 is a PWM control circuit (hereinafter referred to as a "PWM control circuit 2 as appropriate"), and includes an error amplifier (not shown) to which a feedback signal FB generated according to the boosted voltage Vj from the step-up circuit 3 and a reference signal generated such that a reference voltage Vref is divided by resistors 41 and 42 are inputted. A control pulse generated in the PWM control circuit 2 is pulse width modulated according to the comparison of the feedback signal FB with the reference signal and turned into switch circuit controlling signals (gate signals) GU and GL to be inputted respectively to the gate terminals of the switching elements 15 and 16 of the push-pull switching circuit 4, and into the step-up circuit controlling signal (gate signal) GC to be inputted to the gate terminal of the switching element 13 of the step-up circuit 3. In this connection, the PWM control circuit 2 may include, besides the circuit main body thereof, a switch circuit gate signal generating circuit composed of transistors disposed at the output stage of the circuit main body and resistors, and a step-up circuit gate signal generating circuit including a signal adder composed of diodes and a resistor, like in the conventional discharge lamp lighting apparatus 4 shown in FIG. 5.

The constant-voltage circuit 10 is what is called a serial stabilized power supply, and includes a series circuit which is composed of resistors 28 and 29 and a zener diode 40, and which is connected between an input voltage line (a2) and ground, and a reference voltage generated at the zener diode 40 is inputted to the base terminal of an NPN transistor 26 connected in series to the input voltage line (a2), whereby the voltage across the base and emitter terminals of the NPN transistor 26 is kept constant thus providing a predetermined output voltage. The constant-voltage circuit 10 further includes a transistor 27 and a resistor 30 which in combination function as a protection circuit against a rapid increase of load current. The present invention is not limited to a specific structure of a constant-voltage circuit, and any appropriate constant-voltage circuit with a desired characteristic may be employed. Further, the constant-voltage circuit 10 may be even omitted depending on the external DC voltage supply used and on the specifications of the other circuits in the discharge lamp lighting apparatus 1.

The on-off switching circuit 6 is connected to the constant-voltage circuit 10. The on-off switching circuit 6 principally includes a PNP transistor 19 as a switch main body, and a resistor 39 and a capacitor 40 which are both connected between the base and emitter terminals of the transistor 19 so as to achieve a predetermined base potential. The base terminal of the transistor 19 is connected to a terminal to which an external on-off signal is inputted. The present invention is not limited to a specific structure of an off-off switching circuit, and any of appropriate on-off switching circuits with a desired characteristic may be employed.

The input voltage Vi (e.g., 24 V) from the external DC voltage supply is applied to the step-up circuit 3 via the input voltage line (al), and the step-up circuit 3 outputs the boosted voltage Vj (e.g., 70 V). A drive voltage Vcc (e.g., 15 V) from the constant-voltage circuit 10 connected to the input voltage line (a2) is applied directly to the PWM control circuit 2, and a drive voltage Vcc (substantially identical to the aforementioned drive voltage Vcc) from the constant-voltage circuit 10 is applied, via the on-off switching circuit 6, to the switch signal buffering circuit 8, the reference voltage shifting circuit 9, and to the push-pull switching circuit 4.

The switch signal buffering circuit 8 includes comparators 17 and 18 to which the drive voltage Vcc coming from the on-off switching circuit 6 is applied. A reference voltage (e.g., Vcc/2) composed of the drive voltage Vcc divided by resistors 43 and 44 is inputted to the inverting input terminals of the comparators 17 and 18, the switch circuit gate signals GU and GL from the PWM control circuit 2 are inputted respectively to the non-inverting input terminals of the comparators 17 and 18, and the output terminals of the comparators 17 and 18 are pulled up to the drive voltage lines. The switch signal buffering circuit 8 thus structured functions as a buffer circuit for the switch circuit gate signals GU and GL having a rectangular wave pulse.

The reference voltage shifting circuit 9 includes a series circuit which is composed of a capacitor 25 and a resistor 37, one terminal of which is connected to the line for the drive voltage Vcc outputted from the on-off switching circuit 6, and the other terminal of which is connected to the connection point of the resistors 41 and 42 to divide the reference voltage Vref.

The operation of the discharge lamp lighting apparatus 1 will be described with reference to FIGS. 3A to 3G.

Figure 3:
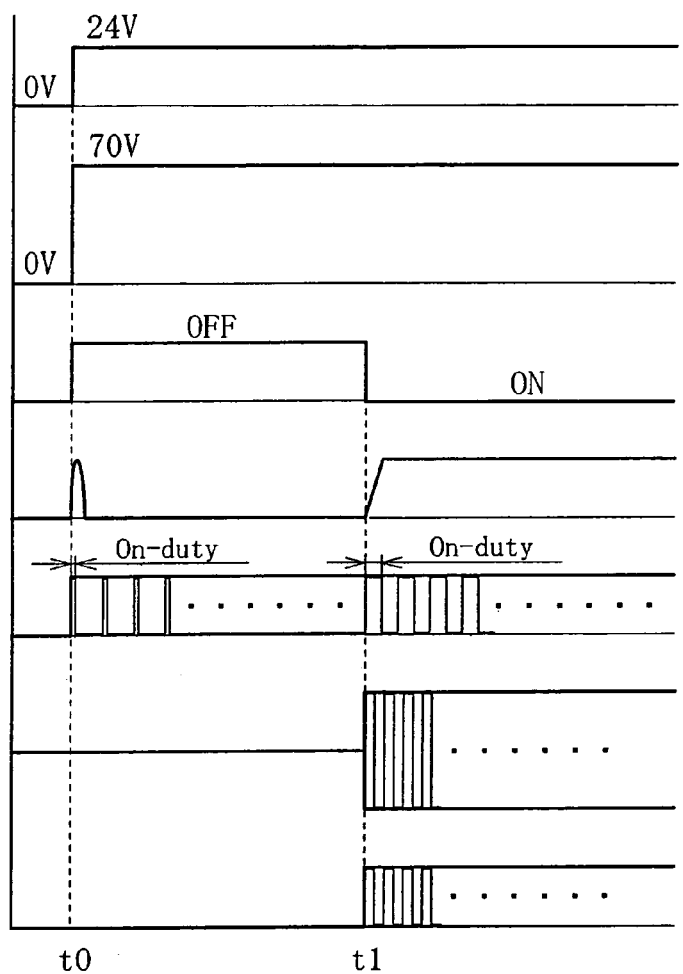
FIGS. 3A to 3G are sequence charts for explaining an operation of the discharge lamp lighting apparatus of FIG. 1.
Figure 4:
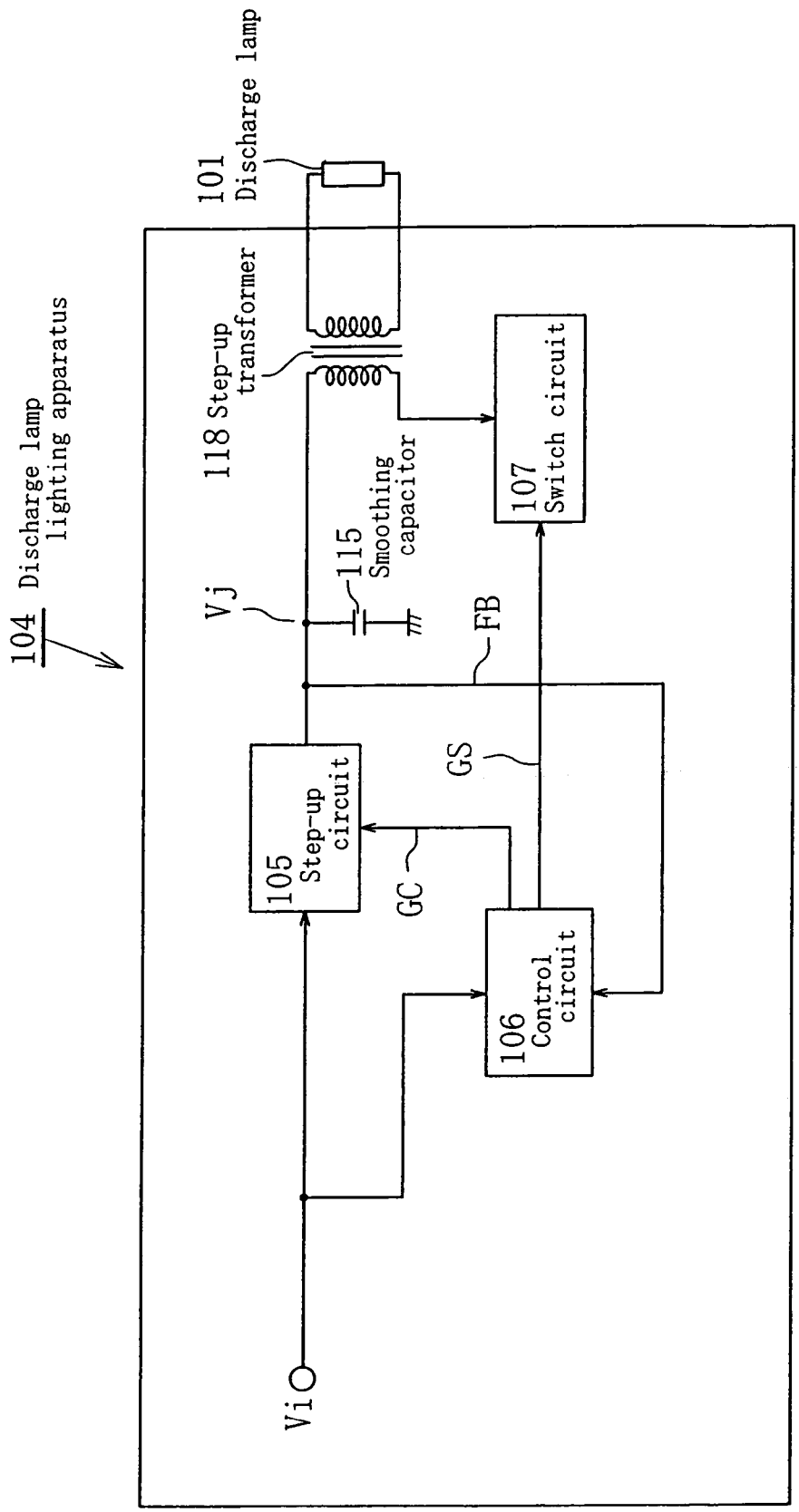
FIG. 4 is a block diagram of a conventional discharge lamp lighting apparatus.

The input voltage Vi (e.g., 24 V) from the external DC power supply, when inputted to the discharge lamp lighting apparatus 1 at time t0 as shown in FIG. 3A, is fed to the step-up circuit 3, and also to the constant-voltage circuit 10 and converted thereby into the drive voltage Vcc (e.g., 15 V) to be applied to the PWM control circuit 2. Then, the PWM control circuit 2 outputs the step-up circuit gate signal GC, and a gate signal shown in FIG. 3E is inputted to the switching element 13 of the step-up circuit 3 thereby starting its on-off operation. As a result, the boosted voltage Vj (e.g., 70 V) is generated across the both terminals of the smoothing capacitor 7 as shown in FIG. 3B.

At this stage, an on-off signal A is at a high-state as shown in FIG. 3C, the on-off switching circuit 6 is at an off-state, and the switch signal buffering circuit 8 is out of operation. Accordingly, though the generation of the switch circuit gate signals GU and GL is started in the PWM circuit 2, the switch circuit gate signals GU and GL generated do not get to the push-pull switching circuit 4 as shown in FIG. 3G as gate signals for the switching elements 15 and 16, thus the push-pull switching circuit 4 is not brought into operation. Consequently, as shown in FIG. 3D, an input current B flows instantaneously upon supply of the input voltage Vi at time t0 but immediately ceases to flow. And, since a gate signal E for the switching element 15 of the push-pull switching circuit 4 does not operate as shown in FIG. 3G, an output current D does not flow at the secondary side of the high-voltage transformer 5 as shown in FIG. 3F, thus the discharge lamp 11 is not lighted at this time.

As described above, after the input voltage Vi is inputted at time t0, a standby-state (t0-t1) lapses where the on-off switching circuit 6 is at an off-state, then the external on-off signal turns on into a low-state at time t1 putting the on-off switching circuit 6 into an on-state, and a normal operation condition starts from time t1.

When the on-off switching circuit 6 turns into an on-state at time t1 as shown in FIG. 3C, the drive voltage Vcc is applied to the switch signal buffering circuit 8 so as to cause the switching signal buffering circuit 8 to start its operation, and thus the switch circuit gate signals GU and GL from the PWM control circuit 2 get to the push-pull switching circuit 4 as the gate signals for the switching elements 15 and 16 thereby causing the push-pull switching circuit 4 to start its operation. Then, the high-voltage transformer 5 is driven by the push-pull switching circuit 4, and the input current B starts to flow as shown in FIG. 3D thereby causing the output current D to flow at the secondary side of the high-voltage transformer 5 as shown in FIG. 3F, thus the discharge lamp 11 is lighted.

In the discharge lamp lighting apparatus 1 having the operation sequence described above, the moment (time t0) the input voltage Vi is applied, the output voltage is stepped up to the boosted voltage Vj prescribed, and the charging of the smoothing capacitor 7 is finished. Therefore, when the on-off switching circuit 6 is turned on (time t1), no rush current is superposed on the input current B and the output current D, thus giving no stress on the electrode of the discharge lamp 11 and consequently preventing the shortened life of the discharge lamp 11. Also, since no rush current flows in the discharge lamp 11, there is no need to implement a delayed operation of a step-up circuit as conventionally done for suppressing a rush current. Consequently, the waveform of the output current D for the discharge lamp 11 makes a sharp rise, which results in rapid and stable lighting of the discharge lamp 11.

Thus, the switch signal buffering circuit 8 functions as a buffer to operate the push-pull switching circuit 4 in conjunction with the startup of the on-off switching circuit 6 after the boosting operation of the step-up circuit 3 is completed, and the respective operations of the step-up circuit 3 and the push-pull switching circuit 4 can be performed independently from each other by one single circuit (the single PWM control circuit 2), rather than two separate control circuits.

The reference voltage shifting circuit 9 will now be described. Since the discharge lamp 11 is not lighted at the above-described standby-state (period t0-t1 in FIGS. 3A to 3G), the load on the step-up circuit 3 is light. Therefore, the step-up circuit gate signal GC, namely, the gate signal C for the switching element 13 of the step-up circuit 3 has a pulse wave with a very small on-duty as shown in FIG. 3E. Consequently, when the on-off switching circuit 6 is turned on, the step-up circuit gate signal GC, which has such a very small on-duty, cannot gain a sufficient power to drive the discharge lamp 11 thus possibly failing to successfully light the discharge lamp 11. This problem is solved by providing the reference voltage shifting circuit 9 which generates the step-up circuit gate signal GC to duly enable lighting the discharge lamp 11.

The reference voltage shifting circuit 9 operates as follows. The reference signal formed by dividing the reference voltage Vref, and the feedback signal FB from the step-up circuit 3 are inputted to the PWM control circuit 2, and the pulse width of the step-up circuit gate signal GC is modulated according to the difference voltage between the reference signal and the feedback signal FB and outputted to the step-up circuit 3. Then, the reference voltage shifting circuit 9 supplies the power supply voltage Vcc to the PWM control circuit 2 by the function of the capacitor 25 only for the moment the on-off switching circuit 6 is turned on, thereby boosting the reference voltage up to a voltage higher than the prescribed voltage, which results in increasing the difference voltage between the reference signal and the feedback signal FB from the step-up circuit 3, which are inputted to the PWM control circuit 2. This causes the PWM control circuit 2 to determine that the boosted voltage Vj of the step-up circuit 3 is lowered, and therefore the on-duty of the step-up circuit gate signal GC, that is the on-duty of the gate signal C for the switching element 13 of the step-up circuit 3 is increased as shown in FIG. 3E. As a result, the output of the step-up circuit 3 is caused to increase temporarily thereby stably lighting the discharge lamp 11.

In the discharge lamp lighting apparatus 1 described above, the discharge lamp 11 is preferably a rare gas discharge lamp utilizing dielectric barrier discharge. Also, the switch circuit 4 is not necessarily a push-pull switching circuit, and may be of, for example, a full-bridge or half-bridge structure, or may alternatively be constituted by one single switching element.

What is claimed is:

1. A discharge lamp lighting apparatus comprising:
an inverter circuit comprising a switch circuit and a high-voltage transformer defining primary and secondary sides, wherein the primary side of the high-voltage transformer is driven by the inverter circuit thereby lighting a discharge lamp connected at the secondary side of the high-voltage transformer;
a step-up circuit connected at an input stage of the inverter circuit;
a control circuit to output a switch circuit controlling signal for controlling an operation of the switch circuit and a step-up circuit controlling signal for controlling an operation of the step-up circuit;
an on-off switching circuit connected at an input voltage line;
a switch signal buffering circuit which is connected between the control circuit and the switch circuit, and which relays the switch circuit controlling signal, wherein a drive voltage is applied to the control circuit without going through the on-off switching circuit while the drive voltage is applied to the switch signal buffering circuit via the on-off switching circuit; and
a reference voltage shifting circuit which is connected between the control circuit and the on-off switching circuit, and which is configured to operate so that the control circuit increases an output of the step-up circuit temporarily when the on-off switching circuit transists to an on-state.

2. The discharge lamp lighting apparatus according to claim 1, wherein the step-up circuit is a step-up chopper circuit comprising a choke coil connected in series to the input voltage line, a diode connected in series to the choke coil, and a switching element connected between ground and a connection point of the choke coil and the diode, the switch circuit comprises at least one switching element connected to the primary side of the high-voltage transformer, and the control circuit comprises a pulse width modulation control circuit to generate, according to a reference voltage, pulse width modulating signals for controlling respective on-off operations of the switching element of the step-up circuit and the at least one switching element of the switch circuit.

3. The discharge lamp lighting apparatus according to claim 1, wherein the discharge lamp is a rare gas discharge lamp utilizing a dielectric barrier discharge.

4. The discharge lamp lighting apparatus according to claim 1, wherein the switch circuit is a push-pull switching circuit.

5. The discharge lamp lighting apparatus according to claim 1, wherein an output signal of the on-off switching circuit is controlled by an on-off signal externally inputted.

6. The discharge lamp lighting apparatus according to claim 1, wherein the discharge lamp lighting apparatus further comprises a constant-voltage circuit which is connected between the input voltage line arid the on-off switching circuit, and which supplies respective drive voltages to the control circuit, the switch buffering circuit, and the switch circuit.

* * * * *